A. P. PHILLIPS.
CHECK VALVE.
APPLICATION FILED MAR. 9, 1914.

1,173,536. Patented Feb. 29, 1916.

Witnesses:
A. H. McGlinchey.
L. B. Weymouth.

Inventor:
Arthur P. Phillips
by Ralph W. Foster atty.

UNITED STATES PATENT OFFICE.

ARTHUR P. PHILLIPS, OF HAVERHILL, MASSACHUSETTS, ASSIGNOR TO CROSBY STEAM GAGE & VALVE COMPANY, A CORPORATION OF MASSACHUSETTS.

CHECK-VALVE.

1,173,536.  Specification of Letters Patent.  Patented Feb. 29, 1916.

Application filed March 9, 1914. Serial No. 823,286.

*To all whom it may concern:*

Be it known that I, ARTHUR P. PHILLIPS, a citizen of the United States, and a resident of Haverhill, in the county of Essex and State of Massachusetts, have invented certain new and useful Improvements in Check-Valves, of which the following is a specification.

This invention relates to check valves and its object is to provide a valve of simple and compact construction, which may be easily and quickly assembled, or taken apart, and which is particularly adapted for use with high pressures, being so constructed as to prevent the shock occurring when such pressures are removed, or their direction changed.

Figure 1:
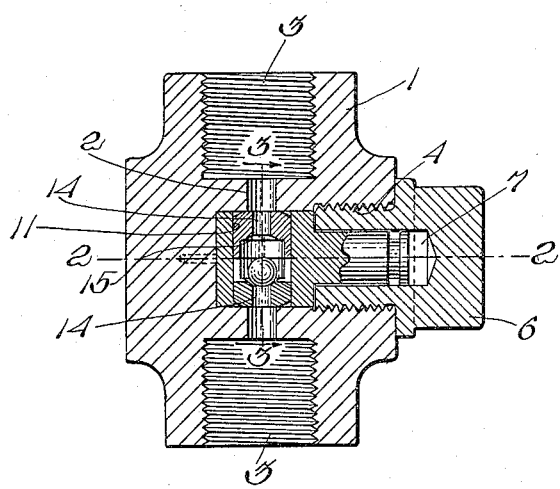
Figure 2:
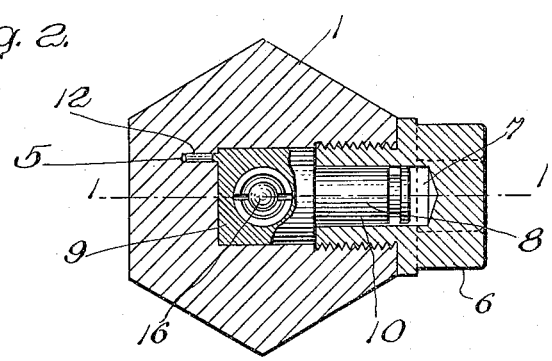
Figure 3:
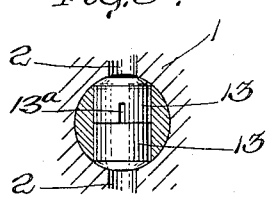
Figure 4:
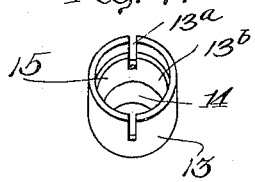

The invention is illustrated by the accompanying drawings in which:

Figure 1 is a vertical, central, sectional view. partly in elevation, of the valve on the line 1—1 Fig. 2; Fig. 2 is a transverse, central, sectional view, partly in elevation, on the line 2—2 Fig. 1; Fig. 3 is a view partly in elevation and partly in section on the line 3—3 Fig. 1; Fig. 4 is a perspective view of the cup shaped members hereinafter described.

The casing 1 is furnished with the vertical passage 2 of comparatively small diameter and interiorly enlarged and threaded at either end 3 for attachment to the devices with which the valve is to be used, as, for instance, the oil reservoir of a hydraulic press and a pressure gage; said casing being furnished centrally with a lateral, threaded bore 4 leading from the exterior at right angles to and extending beyond said first named vertical passage 2; said bore being greatly reduced and eccentrically extended at 5. The exteriorly threaded nut 6 is furnished with a bore 7 and is adapted to be screwed into and engage the threaded bore 4 of the casing, just described, and is of such length as, when in place, to leave the vertical passage 2 through the casing unobstructed. The plug 8 has its inner end 9 enlarged to fit the lateral bore 4 in the casing and its outer end 10 reduced to fit the bore 7 in the nut and is furnished with a transverse passage 11 larger than and adapted, when said plug is in place, to register with the vertical passage 2 through the casing, thus continuing said passage; said plug 8 being furnished with the stud 12 so positioned as to engage the small bore 5 of the casing, when the passage 11 registers with the passage 2, thereby preventing rotation of said plug and the consequent interruption of said passage through the valve. The two similar cup shaped members 13 are adapted to fit closely and vertically into the passage 11 of the plug 8 and are furnished with vertical apertures 14 adapted to register with the vertical passage 2 through the casing, thus preserving the uninterrupted passage therethrough. These members 13 are furnished with sockets 15 adapted to form seats 13<sup>b</sup> for the ball valve 16, the parts being so proportioned that, when assembled, the members 13 form a chamber in which the ball valve is loosely confined, having a slight vertical as well as lateral play therein. Each of the cups is slotted at 13<sup>a</sup>, thereby providing a passage past the ball valve when seated, the result being that the passage through the valve, while restricted, is never wholly obstructed. This is a very important provision in valves used with high pressures, as it prevents the sudden jars caused when the pressure is removed, as, for instance, at the end of each operation of the hydraulic press, above mentioned, employed to force axles into wheels, in which operation the oil is forced into the gage under high pressure, which pressure is removed after each operation. This feature is fully illustrated in Fig. 4 which shows a perspective view of the cup shaped members 13, in which the slot 13<sup>a</sup> extends below the valve seat 13<sup>b</sup> leading into the vertical aperture 14.

Another feature of the improvement is that it affords easy access to the working parts of the valve and enables the operator to easily remove and replace, or renew them, without removing the main structure, or in any way disturbing it.

Other features of the improvement are its simplicity and compactness and the comparatively low cost of its manufacture.

I claim:

1. A check valve comprising, in combination, a tubular casing interiorly enlarged and threaded at both ends and furnished laterally with a threaded bore leading from the exterior thereof and intersecting the passage therethrough; a nut exteriorly threaded for engagement with said lateral bore of the casing and furnished with a longitudinal bore; a tubular plug adapted to fit into the lateral bore in the casing and into the bore in the nut; two cup shaped members disposed in said plug, forming a chamber therein, and furnished with tubular seats; and a ball valve loosely confined in said chamber; said plug and said ball valve being so disposed as to restrict, without entirely obstructing, the passage through the valve casing; and means affording a passage past said ball valve when seated.

2. A check valve comprising, in combination, a tubular casing interiorly enlarged and threaded at both ends and furnished laterally with a threaded bore leading from the exterior thereof and intersecting the passage therethrough; a nut exteriorly threaded for engagement with said lateral bore of the casing and furnished with a longitudinal bore; a tubular plug adapted to fit into the lateral bore in the casing and into the bore in the nut; two cup shaped members disposed in said plug, forming a chamber therein, and furnished with tubular seats; and a ball valve loosely confined in said chamber; said plug and said ball valve being so disposed as to restrict, without entirely obstructing, the passage through the valve casing; and means affording a passage past said ball valve when seated; together with locking means for preventing the rotation of said plug.

3. A check valve comprising, in combination, a tubular casing interiorly enlarged and threaded at both ends and furnished laterally with a threaded bore leading from the exterior thereof and intersecting the passage therethrough; a nut engaging said passage and having a longitudinal bore; a tubular plug adapted to fit into the lateral bore in the casing and into the bore in the nut; and a ball valve loosely confined in said plug; said plug and said ball valve being so disposed as to restrict, without entirely obstructing, the passage through the valve casing.

4. A check valve comprising, in combination, a tubular casing interiorly enlarged and threaded at both ends and furnished laterally with a threaded bore leading from the exterior thereof and intersecting the passage therethrough; a nut engaging said passage and having a longitudinal bore; a tubular plug adapted to fit into the lateral bore in the casing and into the bore in the nut; and a ball valve loosely confined in said plug; said plug and said ball valve being so disposed as to restrict, without entirely obstructing, the passage through the valve casing, with locking means for preventing the rotation of said plug.

5. In a check valve of the character described, in combination, a tubular casing furnished laterally with a bore leading from the exterior thereof and intersecting the passage therethrough; a tubular plug disposed in said lateral bore in the casing; and a valve loosely confined in said tubular plug; with means for confining the tubular plug in the lateral bore; said valve and said plug being so disposed as to restrict, without entirely obstructing, the passage through the valve casing.

6. In a check valve of the character described, in combination, a tubular casing furnished laterally with a bore leading from the exterior thereof and intersecting the passage therethrough; a tubular plug disposed in said lateral bore in the casing; and a valve loosely confined in said tubular plug; with means for confining the tubular plug in the lateral bore; said valve and said plug being so disposed as to restrict, without entirely obstructing, the passage through the valve casing; with locking means for preventing the movement of said plug.

In testimony whereof I have affixed my signature, in presence of two witnesses.

ARTHUR P. PHILLIPS.

Witnesses:
GEORGE G. CLARK,
RALPH W. FOSTER.

Copies of this patent may be obtained for five cents each, by addressing the "Commissioner of Patents, Washington, D. C."